(12) United States Patent
Bathiche et al.

(10) Patent No.: US 7,890,534 B2
(45) Date of Patent: Feb. 15, 2011

(54) DYNAMIC STORYBOOK

(75) Inventors: Steven N. Bathiche, Kirkland, WA (US); Matthew B. MacLaurin, Woodinville, WA (US); Zachary Lewis Russell, Bellevue, WA (US); Bret P. O'Rourke, Kirkland, WA (US); Shai Guday, Redmond, WA (US); Boyd Cannon Multerer, Redmond, WA (US); Eric P. Wilfrid, Mountain View, CA (US); Manuel Uris Bronstein Bendayan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 335 days.

(21) Appl. No.: 11/966,907

(22) Filed: Dec. 28, 2007

(65) Prior Publication Data

US 2009/0172022 A1    Jul. 2, 2009

(51) Int. Cl.
*G06F 17/30*    (2006.01)
(52) U.S. Cl. ..................... 707/791; 715/255
(58) Field of Classification Search .......... 707/600, 707/608, 609, 705, 791, 802; 715/200, 201, 715/202, 255
See application file for complete search history.

(56) References Cited

U.S. PATENT DOCUMENTS

| | | | |
|---|---|---|---|
| 5,404,444 A | 4/1995 | Billings | |
| 5,604,855 A | 2/1997 | Crawford | |
| 5,999,172 A | 12/1999 | Roach | |
| 6,204,840 B1 | 3/2001 | Petelycky et al. | |
| 7,155,158 B1 * | 12/2006 | Iuppa et al. | 434/350 |
| 7,246,315 B1 | 7/2007 | Andrieu et al. | |
| 2006/0064733 A1 | 3/2006 | Norton et al. | |
| 2006/0224046 A1 * | 10/2006 | Ramadas et al. | 600/300 |
| 2007/0118801 A1 | 5/2007 | Harshbarger et al. | |
| 2007/0132767 A1 | 6/2007 | Wright et al. | |

OTHER PUBLICATIONS

Marc Cavazza, et al. Virtual Actors' Behaviour for 3D Interactive Storytelling http://www-scm.tees.ac.uk/users/f.charles/publications/conferences/2001/eg2001_short.pdf. Last accessed Aug. 20, 2007, 9 pages.

Zeng, et al. Shape of the Story: Story Visualization Techniques. Proceedings of the Seventh International Conference on Information Visualization (IV'03), 1093-9547/03 IEEE http://ieeexplore.ieee.org/iel5/8639/27378/01217971.pdf?tp=&isnumber=&arnumber=1217971. Last accessed Aug. 20, 2007, 6 pages.

David Ventura, et al. Digital Storytelling with DINAH: Dynamic, Interactive, Narrative Authoring Heuristic http://www.cs.virginia.edu/~dbrogan/Publications/Papers/dinahFINAL.pdf. Last accessed Aug. 20, 2007, 9 pages.

Heather Barber, et al. Dynamic Generation of Dilemma-based Interactive Narratives, Association for the Advancement of Artificial Intelligence (www.aaai.org)., 2007. http://www-users.cs.york.ac.uk/~hmbarber/aiide07.pdf. Last accessed Aug. 20, 2007, 6 pages.

* cited by examiner

*Primary Examiner*—Fred I Ehichioya
(74) *Attorney, Agent, or Firm*—Wolf, Greenfield & Sacks, P.C.

(57) ABSTRACT

A system (and corresponding methodology) that dynamically alters a storybook (e.g., literary work). Preferences, policies and contexts can be considered and incorporated into the storyline of the book to enhance interest by creating a rich, personalized experience. By enhancing readability and features (e.g., sensory features), stories become more true-to-life and enjoyable by altering the story over time or to differing context (or content).

19 Claims, 11 Drawing Sheets

DYNAMIC STORYBOOK

BACKGROUND

Reading classic books is a pastime enjoyed by many whereas the enjoyment continues even upon a second or third read of the same story or novel. 'Classics' are often viewed to comprise what some call a 'canon' of world literature or art. In the traditional sense, a classic book is one written in ancient Rome or ancient Greece. However, today, 'classic' is often applied to literature and other art (e.g., motion pictures) that is widely considered a model of its form. By way of example, authors who have written 'classics' include 'William Shakespeare,' 'Jonathan Swift,' 'James Joyce,' 'Lewis Carroll,' 'Geoffrey Chaucer,' and 'Mark Twain,' among others.

Although most traditional 'classics' are products of history years ago, the words and themes of these 'classics' are sometimes used to describe newer works. Because of their age, many classic works have exceeded the term of copyright protections. Thus, many are now in the public domain and free to use by anyone without issues involving copyright infringement.

To keep the classics in circulation for generations to come, many of these works have been modified to conform to today's technological age. For instance, many of the classics are now available in digital form such that users can enjoy them via a computer, personal media player, smart-phone, personal digital assistant (PDA) or the like. As many of the classics have been altered to conform with technology, many times, this adaptation also improves upon quality and longevity of the original work.

As described above, a 'classic' is often interpreted as merely a widely-read book or storyline, however, it very often refers to a work that marks a turning point in history. With respect to these literary works, 'classics' may reflect the traditional views of earlier societies or report social conflicts during a particular time. It has been said that 'classics' that dominate in literature often suggest a social or philosophical change.

Some people enjoy many 'classics' because of the clever development of the plot and/or characterization. Although, many of the classic works have been modified to conform to technological advances, these modifications have merely been to improve circulation, to increase availability, or to enhance quality and longevity of the storyline. In other words, content of the classics has not been altered over time. Even though the storyline of most 'classics' is known by many, an interesting characteristic of a 'classic' is that, although most know the storyline, they have been read and enjoyed over and over by past generations and will be for generations to come.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

One favorite pastime of many people is the ability to either read or follow a given storyline. Often times, the story is a 'classic' and can be read many times over without losing its appeal. When reading a story, for example, black and white text is still a main medium for conveying a writer's thoughts. Given modern approaches and the ability to present text in many formats, conventional reading processes lag the capabilities that can be provided from today's technology and computerized components.

The innovation disclosed and claimed herein, in one aspect thereof, comprises systems (and corresponding methodologies) that dynamically alter a story (e.g., literary or motion picture work). In aspects, preferences, policies and contexts can be considered and incorporated into the storyline to enhance interest by creating a rich, personalized experience. Additionally, the innovation discloses capability of dynamically altering the reader's environment in accordance with a storyline (e.g., plot).

By enhancing readability, stories become more true-to-life and enjoyable by adapting the story over time or to differing context. Moreover, the innovation discloses a dynamic media or storybook that can employ stored (and/or dynamically generated) features such as magic, lighting, sounds, and other sensory features to enhance the telling or presentation of a given story. This can include dynamically altering a story form in view of a subset of potential plots that could be interactively navigated randomly or by a reader. For instance, a random feature could be selected where a different story would be constructed from story subsets residing in a database. A more navigable approach may allow the user to control the direction of a storybook where each control subsequently alters future actions taken by the storyline of the book.

As different plots or scenes are encountered or generated, dynamic elements can change in the presentation such as generating the sound of wind in an outdoor scene and changing the background color of a scene to match a given weather pattern. Other sensory aspects such as smells, touch, and tastes can also be influenced in view of dynamic aspects associated with the story. In aspects, these features can be triggered based upon content of the story and/or context of the reader.

In yet another aspect thereof, machine learning and reasoning mechanisms are provided that employ a probabilistic and/or statistical-based analysis to prognose or infer an action that a user desires to be automatically performed.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
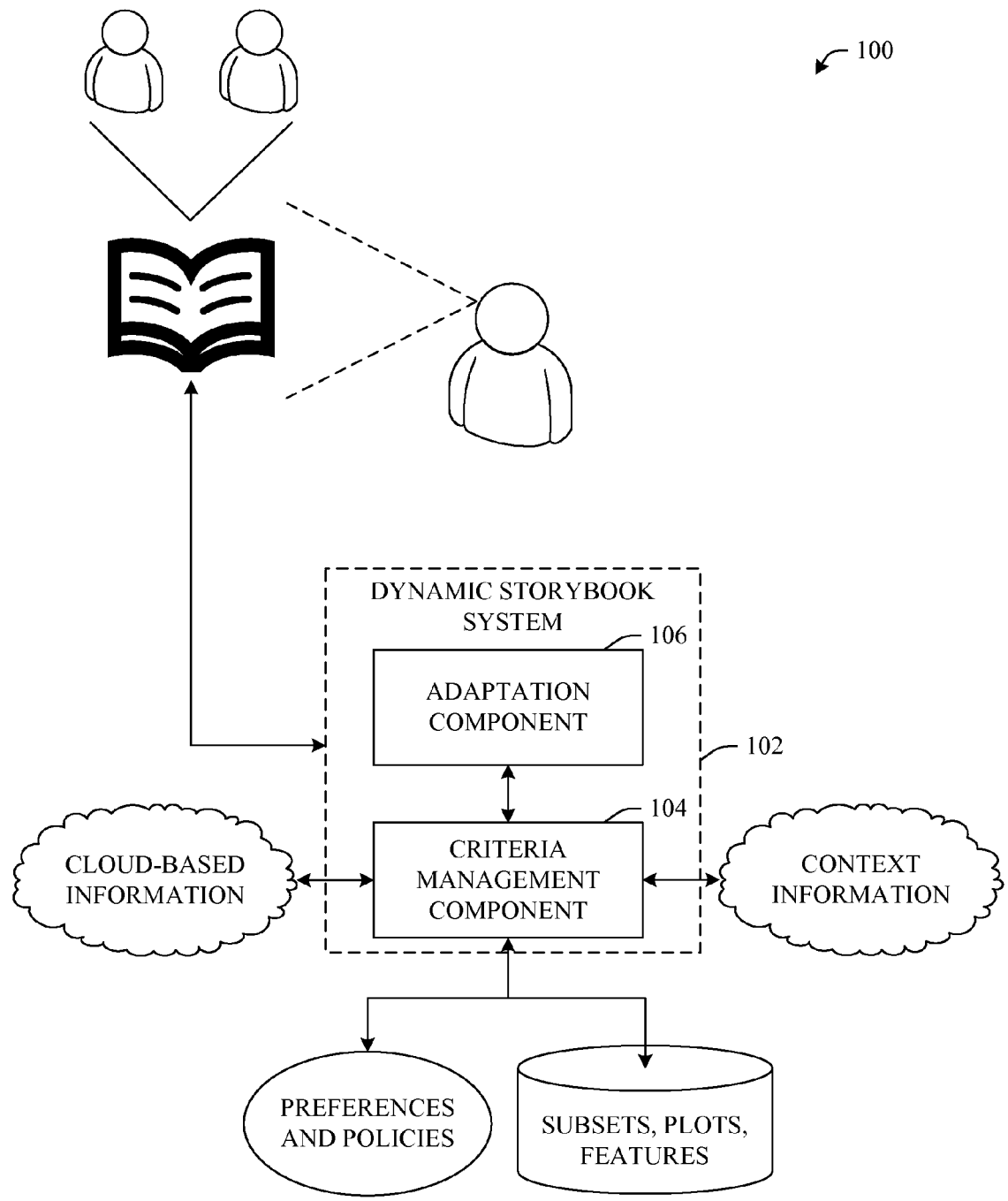
FIG. 1 illustrates an example system that facilitates dynamic storybook adaptation in accordance with an aspect of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to the drawings, FIG. 1 illustrates a system that enables dynamic adaptation of a storybook in accordance with an aspect of the innovation. Essentially, the system 100 can dynamically incorporate context information, preferences, policies, predefined subsets, plots, features, cloud-based information, etc. As will be understood upon a review of the figures that follow, by dynamically adapting, the innovation can provide a more personalized, enhanced and interactive environment which can increase enjoyment and information conveyed by the storybook.

Generally, the system 100 can include a dynamic storybook component 102 that can incorporate context, preferences, policies, subsets, plots, features, cloud-based information as desired or appropriate to enhance a user or reader experience. Essentially, the innovation enhances a reader's experience by incorporating context and other features into the storyline of a storybook. It is to be understood that incorporation into the storyline includes both modification of content as well as environmental features related to the presentation of a storyline. These examples will become more apparent upon a review of the discussion that follows.

As shown, the dynamic storybook system can include a criteria management component 104 and an adaptation component 106—together these components (104, 106) enable aggregation of data, incorporation of the data, adaption of a storyline and presentation of the adapted storyline in accordance with aspects. For instance, the system 102 is capable of monitoring environment context (e.g., physical conditions, location, date/time . . . ) and can dynamically alter or adapt a storyline to coincide with actual conditions. Thus, the reader experience can be enhanced by creating a more true-to-life experience.

By way of more specific example, the system 100 can establish a location using a global positioning system (GPS) or other suitable sensor. Thereafter, cloud-based information can be accessed to determine a current weather condition. In other examples, environmental sensors can be used to establish weather conditions. In either case, the storyline can be altered to include descriptive text that coincides with the current conditions. Thus, the reader can more intimately identify with the storyline. While examples are described herein, it is to be understood that these examples are provided to add perspective to the innovation and are not intended to limit the innovation in any manner. According, it is to be understood that countless examples exist which are to be included within the scope of this innovation and claims appended hereto. Additionally, it is to be understood that the innovation can be use in fictional works, non-fictional works, or a combination as appropriate.

One favorite pastime of many people is the ability to either read or follow a given storyline. Often times, the story is a classic and can be read many times over without losing its appeal. When reading a classic story for example, black and white text is still the main medium for conveying a writer's thoughts. Although different rendering devices and storage formats exist, given modern capabilities and the ability to present text in many formats, unfortunately, conventional reading processes lag the capabilities that can be provided from today's computerized components.

Also, stories may be more enjoyable if there were mechanisms capable of adapting the story over time or to differing content or context—here, the innovation discloses these mechanisms. Essentially, the innovation is a dynamic storybook system 102 that can employ stored features such as magic, lighting, sounds, and other sensory features, content modification, etc. to enhance the telling or presentation of a given story. This dynamic adaptation can include dynamically altering a story form in view of a subset of potential plots that could be navigated by a user.

In one aspect, the adaptation component 106 can select a random feature where a different story would be constructed from story subsets residing in a database. A more navigable approach may allow a user to control the direction of a story where each control subsequently alters future actions taken by the storybook. As different plots or scenes are encountered, generated, or created, dynamic elements can change in the presentation such as generating the sound of wind in an outdoor scene and changing the background color of a scene to match a given weather pattern. Effectively, these dynamic elements can dynamically alter a reader's environment (e.g., ambient lighting, temperature, etc.) in accordance with the plot. Other sensory features such as smells, touch, and tastes can also be influenced in view of dynamic aspects associated with the storyline.

Storybook features can be used to supplement memory patterns in individuals and promote such aspects via a remote offloading of tasks by creating a story that outlines a given task. This could include incorporating hyperactive avatars on a page or display and using previous data to create lifetime books highlighting a user's past experiences. Still other aspects include downloading personal snippets from the book and reliving past experiences through the book. These can include adaptive experiences such as how to improve one's golf game or other activity, adding other context to the storyline.

In specific examples, the dynamic storybook can be employed at local work centers and polling places to provide feedback along with assisting location generated news. In one example, the dynamic storybook system 102 can be used to assist in training a new employee by recreating experiences and actions of another employee. In other words, the new employee can be presented with a storyline of an employee that has gone through similar (or the same) job functions, etc. As can be understood, this example is a non-fictional example of a use for the dynamic storybook functionality.

In another example, a fictional and non-fictional storyline of a book can be dynamically altered based upon actions of a reader, for example, if a user enjoys listening to a particular type of music, the music can be injected into the presentation of the storyline. Similarly, individuals in proximity (e.g., friends, co-workers . . . ) can be characterized within the storyline to enhance the reader experience. As described above, the examples are endless—all of which are to be included within the scope of the innovation and claims appended hereto. Still further, as desired, all or a portion of the storyline can be captured (e.g., recorded) for subsequent playback or real-time sharing as desired.

While many of the aspects described herein are directed to a single reader, it is to be understood that the system is capable of combining multiple reader's experiences and dynamically altering the storyline as appropriate. For example, as described herein, the system can detect readers and automatically inject names, preferences, characteristics, context, etc. associated to each of the readers into the storyline as appropriate. These collaborative aspects can enhance group reading experiences, for example in an educational context.

Figure 2:
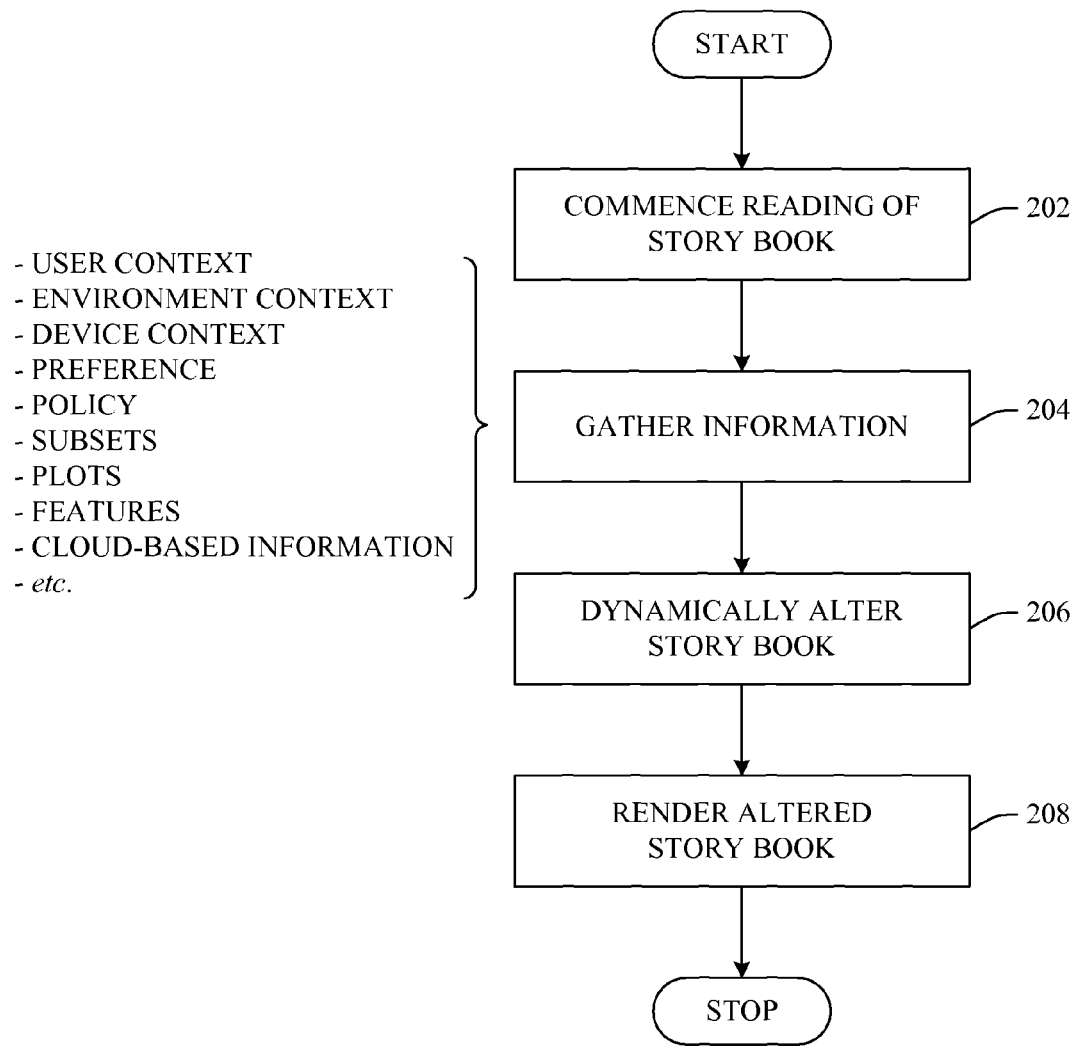
FIG. 2 illustrates an example flow chart of procedures that facilitate adaptation of a storybook in accordance with an aspect of the innovation.

FIG. 2 illustrates a methodology of dynamically altering a storyline in accordance with user preferences or other contextual factors in accordance with an aspect of the innovation. While specific examples are given herein, it is to be understood that there can be countless examples that employ the features, functions and benefits of the innovation. Accordingly, these examples are to be included within the scope of this specification and claims appended hereto. One particular feature of the innovation is the ability to gather information related to preferences, policies and context, process the information, alter a storyline and thereafter render the storyline.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 202, a user can commence reading of a story book. It is to be understood that the story book can include most any storyline including, but not limited to, classic novels, fictional stories, non-fictional stories, combined fiction and non-fiction, technical papers, instruction manuals, etc. In other words, the content of the storyline in no way is intended to limit the scope of the innovation described herein. It is to be understood that the features, functions and benefits of the innovation described herein can be applied to motion pictures without departing from the spirit and scope of this specification.

As described above, the innovation can dynamically gather information which can ultimately be used to modify (or personalize) a storyline. Moreover, it is to be understood that the act of gathering information can be manually triggered by a user, pre-programmed within the storyline, determined randomly or otherwise triggered based upon contextual factors (e.g., time/date, identity/role . . . ). For instance, in one example, the innovation can dynamically determine a user identity/role and thereafter modify a storyline accordingly or otherwise present the user with a short list of alternative storylines that coincide with a particular identity or role. In other words, in a non-fictional/instructional example, the system can determine that the reader is a technical electronics repairman thereby automatically altering the storyline in accordance with the technical abilities of the repairman. Conversely, the system can determine that the reader is a layman thereby dynamically altering the storyline (or instructions) to adhere to a specific level of knowledge of the user. For instance, if the user is not technically savvy, the system can alter the storyline to include more graphical examples and likewise to use more laymen terms for technical components. By way of specific example, rather than instructing to 'insert the RJ11 adapter,' the system can instruct to 'insert the phone cable.'

Referring again to FIG. 2, at 204 information can be gathered which can ultimately be used to dynamically adapt a storyline. As described above, the act of gathering information (204) can include, or rely upon, other acts such as, determine/infer identity/role, access sensory mechanism(s), access remote store, access local store, determine preference/policy, infer preference/policy, etc. For brevity, these acts are not illustrated in FIG. 2 but, are to be considered a part of the innovation and claims appended hereto.

At 204, information such as, but not limited to, user context (e.g., role), environment context (e.g., location, date, weather), device context (e.g., type, state), user preference(s), user policy(ies), pre-defined storyline subsets, plots or features, as well as other information can be gathered. Additionally, at 204, the information can be accessed, retrieved, received or otherwise obtained in accordance with aspects. In other words, in one example, a source can be polled for information whereas, in another aspect, information can be automatically sent by the source. Most any push or pull technology can be used in accordance with aspects of the innovation.

At 206, the storyline can be dynamically altered in accordance with the gathered information. Here, the act of altering can include or otherwise rely upon an act of analyzing the information in order to establish an appropriate or suitable manner by which to alter the storyline. As will be described in greater detail below, the acts described herein can also employ machine learning and reasoning (MLR) mechanisms which can be trained over time to automate decisions on behalf of a user/reader. One such example will be described in greater detail with reference to FIG. 9 infra.

Figure 3:
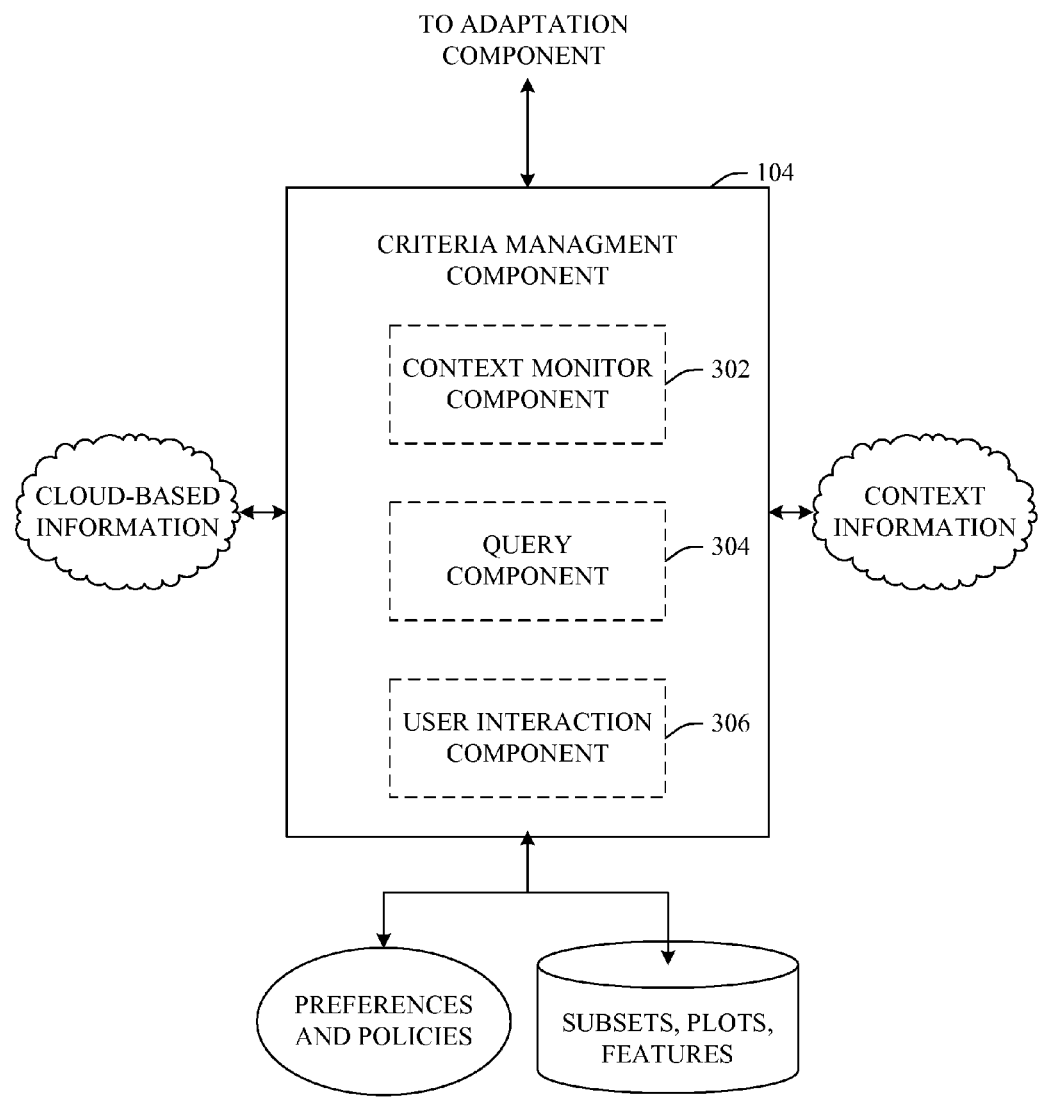
FIG. 3 illustrates an example system that incorporates a variety of information to dynamically adapt a storybook in accordance with an aspect of the innovation.

FIG. 3 illustrates a block diagram of an example criteria management component in accordance with the innovation. As shown, criteria management component 104 can include a context monitor component 302, a query component 304 and user interaction component 306, together, these sub-components facilitate gathering of information which can ultimately be used to adapt a storyline (e.g., presentation features, content, characters . . . ) in accordance with aspects of the innovation.

Figure 5:
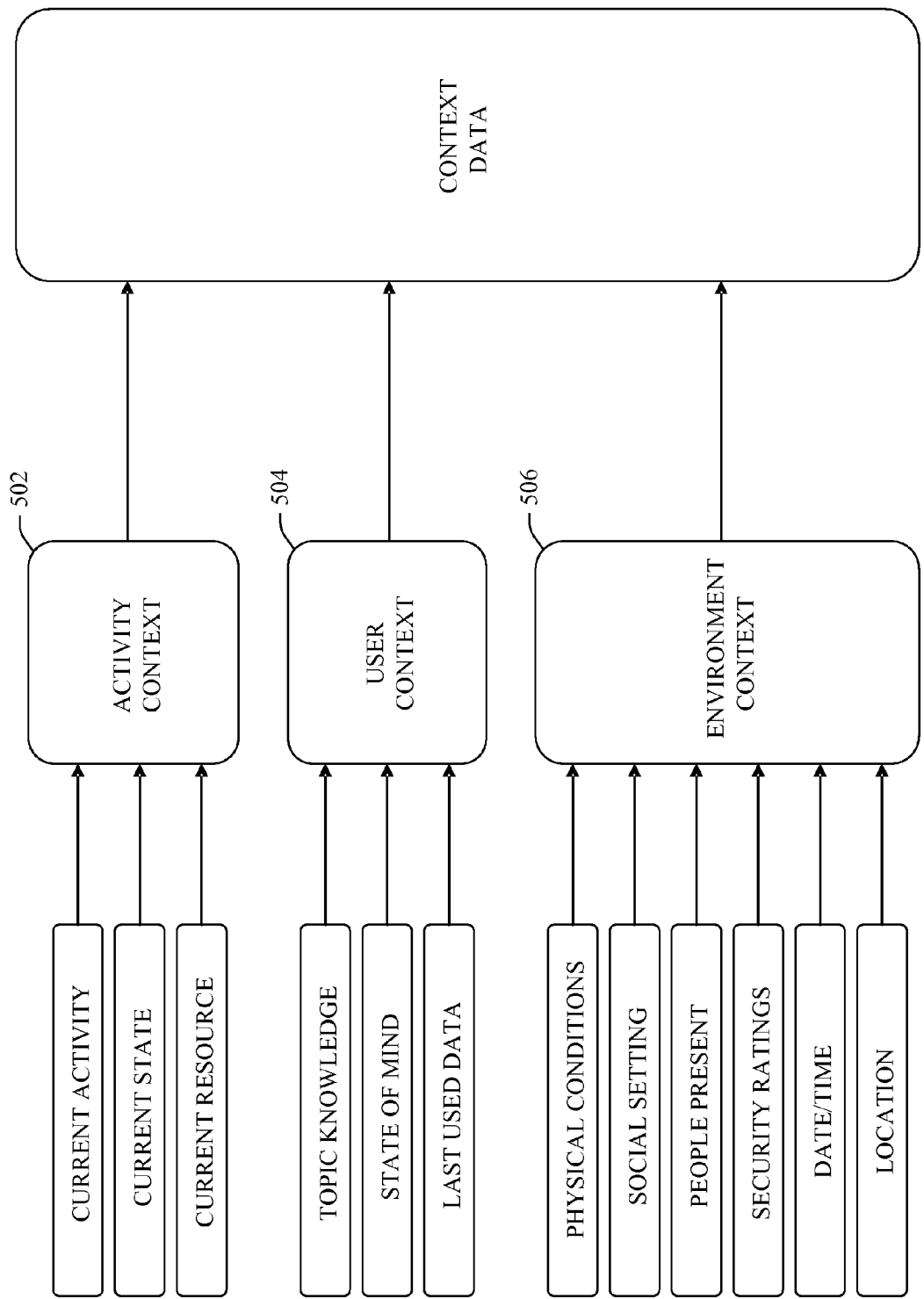
FIG. 5 illustrates example context information that can be used to adapt a storybook in accordance with an aspect of the innovation.

The context monitor component 302 can include most any sensory mechanisms suitable to gather, access, retrieve or otherwise obtain information. Further, as described above, the context monitor component 302 can employ most any push or pull mechanisms known in the art to access or otherwise gather information. Specific examples of context information are illustrated in FIG. 5 that follows.

The query component 304 can be used to access information from a store or other data storage device. For example, a query can be formulated and used to access information from the Internet which can be used to adapt the storyline. The query component 304 can be used to access information to supplement information otherwise gathered, for example via the context monitor component 302. In one example, the criteria management component 104 can employ the context monitor component 302 to determine a location. Here, the query component 304 can be used to access current weather conditions by way of some cloud-based (e.g., Internet) service. Accordingly, the storyline can be adapted to include current weather conditions in presenting the storyline to the reader.

The user interaction component 306 enable a user to set preferences and policies related to storylines. For instance, a reader can preload preferred destinations, roles, occupations, sports, etc. whereby this information is employed to adapt the storyline. Similarly, policies can be set by the user. These preferences and policies can be used in determining (or inferring) when/how to adapt the storyline in accordance with aspects of the innovation.

Additionally, the user interaction component 306 can be used to present options of pre-defined subsets, plots, features, etc. to a user. As well, the component 306 can facilitate entry of this information by the user. Still further, the user interaction component 306 can, in connection with the query component 304, query a user for information which can be used to adapt or otherwise determine/infer how to adapt a storyline.

Figure 4:
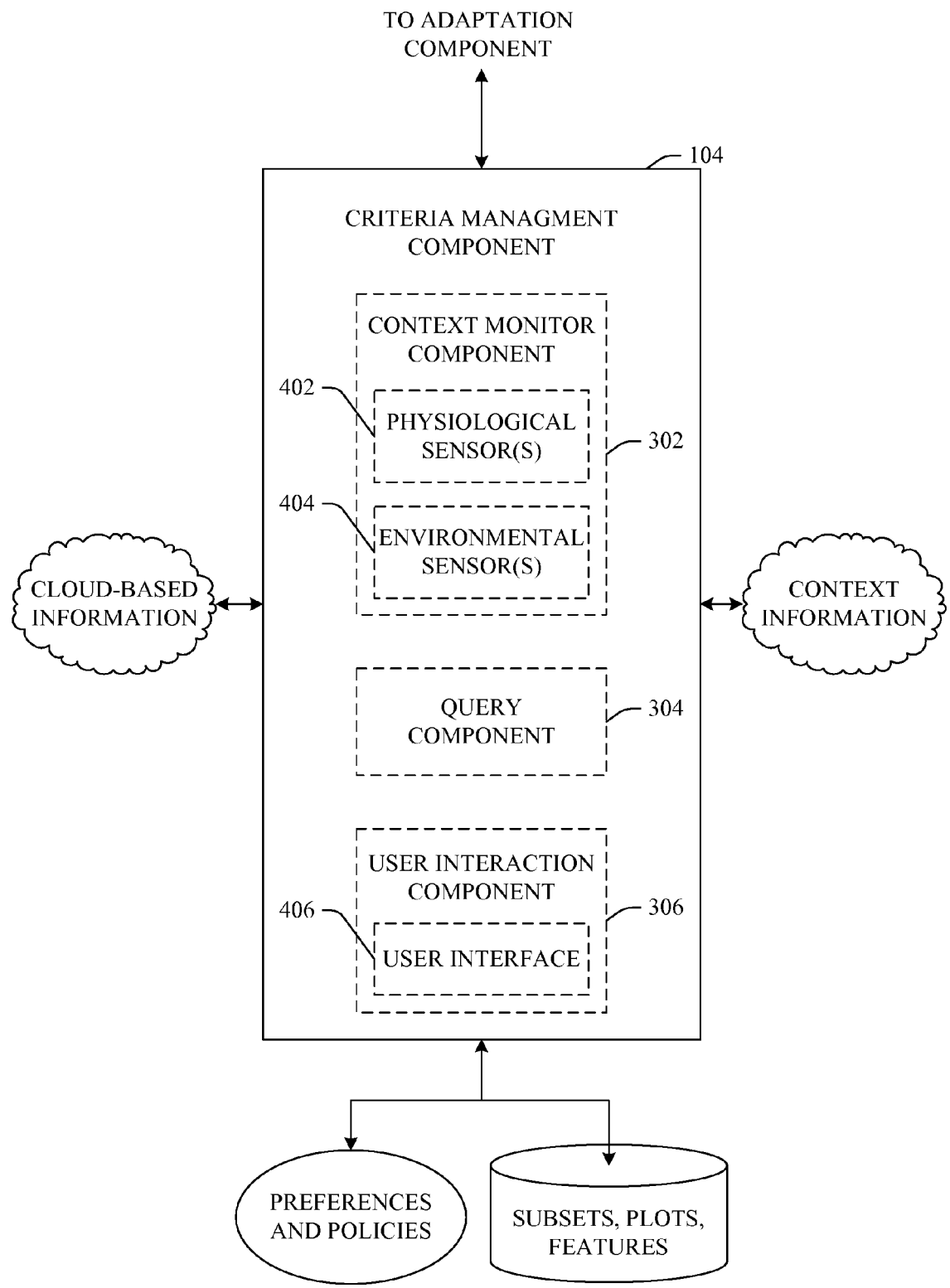
FIG. 4 illustrates an example the employs sensory mechanisms, queries and user interfaces to gather information in accordance with aspects of the innovation.

Turning now to FIG. 4, an alternative block diagram of an example criteria management component 104 is shown in accordance with an aspect of the innovation. As illustrated, context monitor component 302 can include a physiological sensor(s) component 402 and/or an environmental sensor(s) component 404. It is to be understood that these sensor components (402, 404) can include the sensory transducers (e.g., thermal, electromagnetic, mechanical, chemical, optical, acoustic . . . ).

Direct-indicating sensors, for example, a mercury thermometer, are human-readable. Other sensors, such as a thermocouple, can produce an output voltage or other electrical output which can be interpreted by another device (such as a computer processor or software application).

It will be appreciated that sensors are used in everyday applications, such as touch-sensitive elevator buttons, automobile locking mechanisms, biometric fingerprint readers, etc. A sensor's sensitivity indicates how much the sensor's output changes when the measured quantity changes. For instance, if the mercury in a thermometer moves 1 cm when the temperature changes by 1°, the sensitivity is 1 cm/1°. Sensors that measure very small changes must have very high sensitivities. Technological progress allows more and more sensors to be manufactured on a microscopic scale as 'microsensors' that use MEMS (microelectromechanical systems) technology. It is to be understood and appreciated that, although the example context monitor component of FIG. 4 includes physiological sensors 402 and environmental sensors 404, most any sensory mechanisms can be employed in accordance with the innovation.

In aspects, sensors (402, 404) can be used to determine or gather information related to, but not limited to, location, date, time, weather conditions, motion, mood, health, engaged activity, individual in proximity, shared readers of a storybook, etc. As described herein, most any subset of this information can be used to adapt a storyline in accordance with aspects.

The user interaction component 304 can include a user interface (UI) component 406 which enables a user to interact with the system. For example, the UI component 406 enables a user to generate a preference or policy related to adapting storylines. As well, the UI component 406 provides mechanisms by which a user can select from system prompts related to adaptation of a storyline. For instance, the system can present a user with a variety of storyline choices (e.g., plots, features) whereas the UI component 406 enables the user to select from the provided choices thereby triggering adaption of the storyline.

FIG. 5 illustrates a sampling of the kinds of data that can be gathered by the context monitor component, 302 of FIG. 3. In accordance with the aspect illustrated in FIG. 5, the activity context data can be divided into 3 classes: activity context 502, user context 504, and environment context 506.

By way of example, and not limitation, the activity context data 502 includes the current activity the user is performing. It is to be understood that this activity information can be explicitly determined and/or inferred. Additionally, the activity context data 502 can include the current step (if any) within the activity. In other words, the current step can be described as the current state of the activity. Moreover, the activity context data 502 can include a current resource (e.g., file, application, gadget, email, etc.) that the user is interacting with in accordance with the activity.

In an aspect, the user context data 504 can include topics of knowledge that the user knows about with respect to the activity and/or application. As well, the user context data 504 can include an estimate of the user's state of mind (e.g., happy, frustrated, confused, angry, etc.). It will be understood and appreciated that the user's state of mind can be estimated using different input modalities, for example, the user can express intent and feelings, the system can analyze pressure and movement on a mouse, verbal statements, physiological signals, etc. to determine state of mind.

With continued reference to FIG. 5, the environment context data 506 can include the physical conditions of the environment (e.g., wind, lighting, ambient, sound, temperature, etc.), the social setting (e.g., user is in a business meeting, or user is having dinner with his family), the other people who are in the user's immediate vicinity, data about how secure the location/system/network are, the date and time, and the location of the user. As stated above, although specific data is identified in FIG. 5, it is to be understood that additional types of data can be gathered and employed in generating or adapting a storyline in accordance with an aspect of the innovation. As well, it is to be understood that this additional data is to be included within the scope of the disclosure and claims appended hereto.

Figure 6:
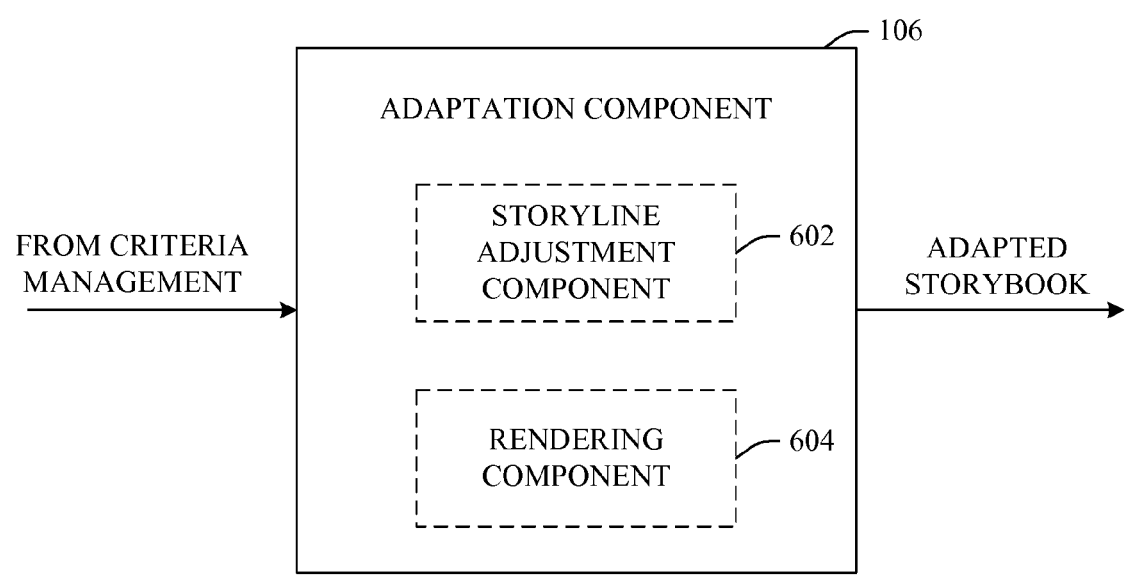
FIG. 6 illustrates an example adaptation component in accordance with an aspect of the innovation.

Referring now to FIG. 6, an example adaptation component 106 is shown to include a storyline adjustment component 602 and a rendering component 604. Together, these two sub-components (602, 604) enable generation and presentation of an adapted storyline respectively. In other words, information from the criteria management component (104 of FIG. 4) can be incorporated into a storyline by the storyline adjustment component 602. Thereafter, the rendering component 604 can be employed to render the adapted storyline to a user, device or application as desired.

Figure 7:
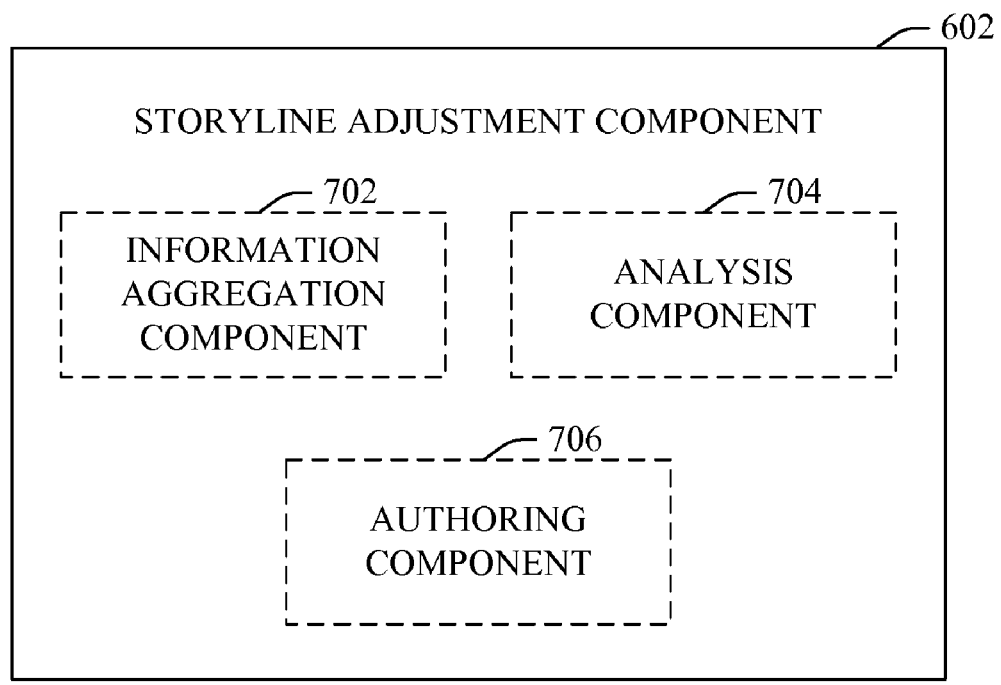
FIG. 7 illustrates an example storyline adjustment component that incorporates gathered information into the storyline of a storybook in accordance with an aspect of the innovation.

As shown in FIG. 7, the storyline adjustment component 602 can include an information aggregation component 702, an analysis component 704 and an authoring component 706. Once the information is received, it can be classified and aggregated by the information aggregation component 702 together with the analysis component 704. The authoring component 706 can facilitate creation of the adapted storyline based upon the aggregated information.

In operation, the authoring component 706 can consider identity or knowledge of the reader upon adapting the storyline. In other words, the authoring component 706 can include comprehensive logic that is capable of adjusting the storyline to adhere with the level of sophistication of the reader. For instance, the authoring component 706 may adjust a storyline differently for a college graduate computer programmer than it would for a junior high school student. In other words, a deeper description of the subject may be employed or alternatively an advance vocabulary can be used to appeal to a more sophisticated audience.

Figure 8:
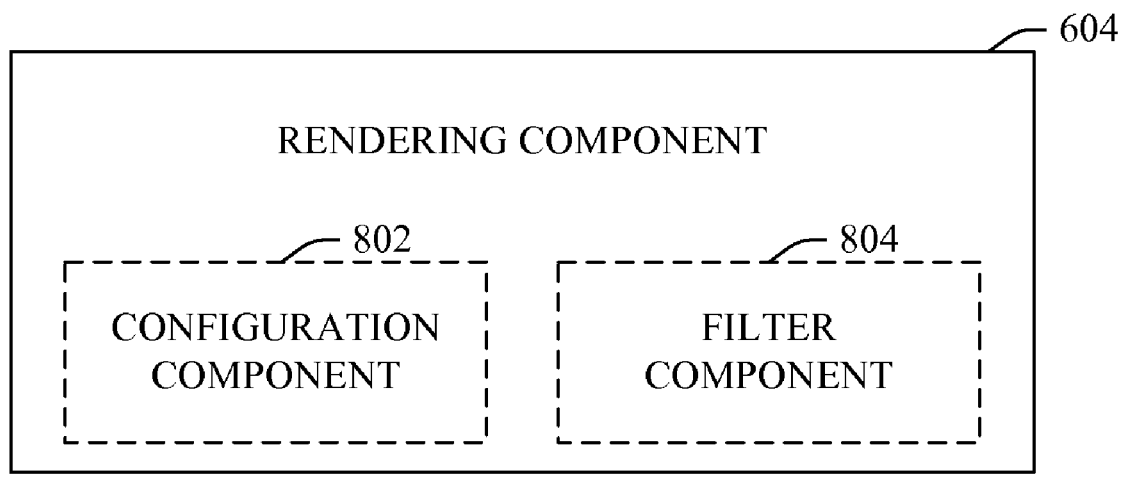
FIG. 8 illustrates an example rendering component that presents an adapted storyline in accordance with an aspect of the innovation.

FIG. 8 illustrates an example block diagram of a rendering component 604 in accordance with an aspect of the innovation. As shown, the example rendering component 604 can include a configuration component 802 and a filter component 804. These sub-components (802, 804) can facilitate arrangement, redaction or censoring as necessary or appropriate. For instance, the sub-components (802, 804) can formulate the storyline into a particular style or language commensurate with the reader, topic, context, etc. Additionally, the filtering component 804 can, among other simple filtering tasks, provide censorship or parental controls as desired.

Figure 9:
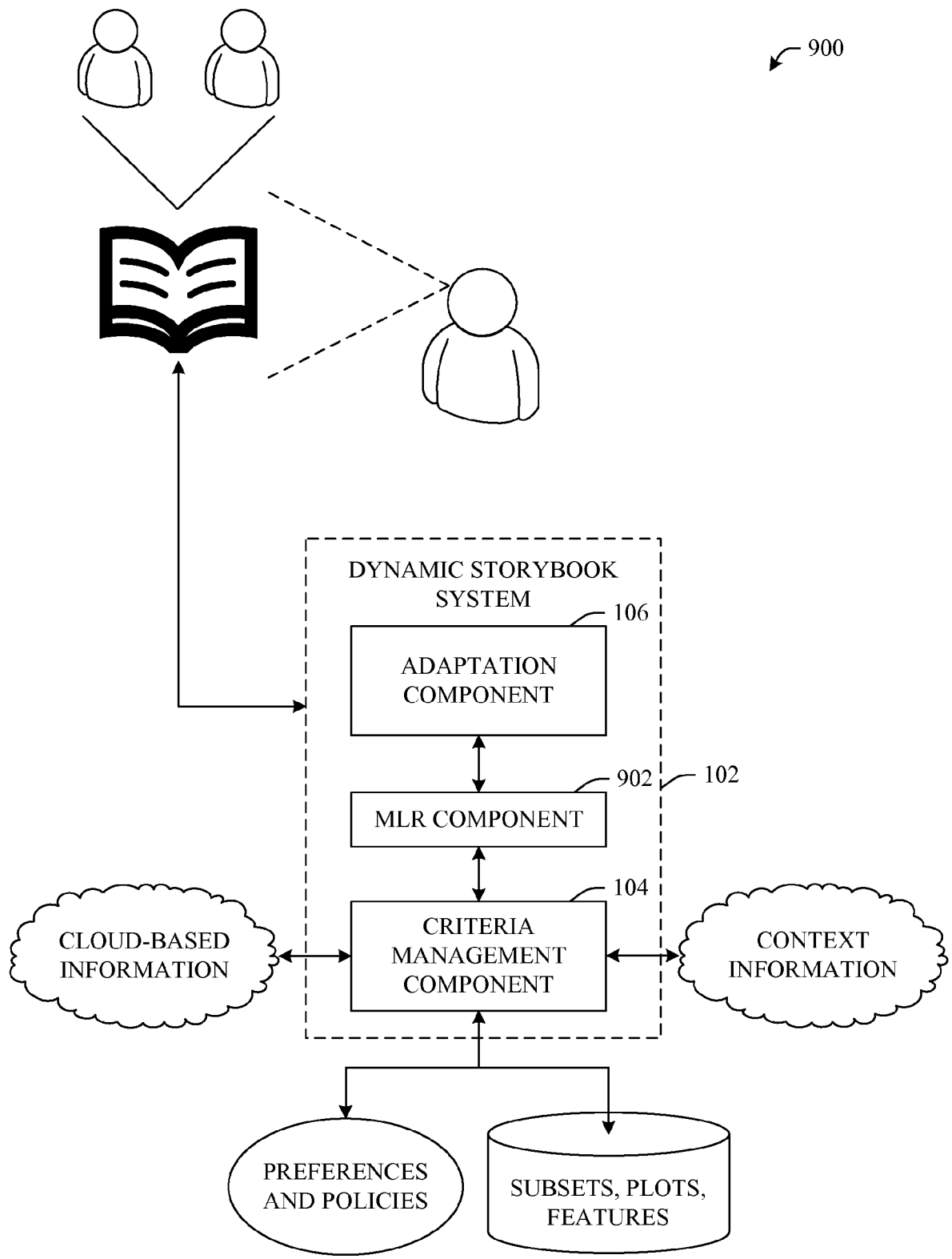
FIG. 9 illustrates an architecture including a machine learning and reasoning component that can automate functionality in accordance with an aspect of the novel innovation.

FIG. 9 illustrates an example system 900 that employs an MLR component 902 which facilitates automating one or more features in accordance with the subject innovation. The subject innovation (e.g., in connection with adapting a storyline) can employ various MLR-based schemes for carrying out various aspects thereof. For example, a process for determining if/when/how to adapt a storyline can be facilitated via an automatic classifier system and process.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria if/when/how to adapt a storyline, what information to gather, specifics of a current (or future) context, preferences of a reader or target audience, etc.

Figure 10:
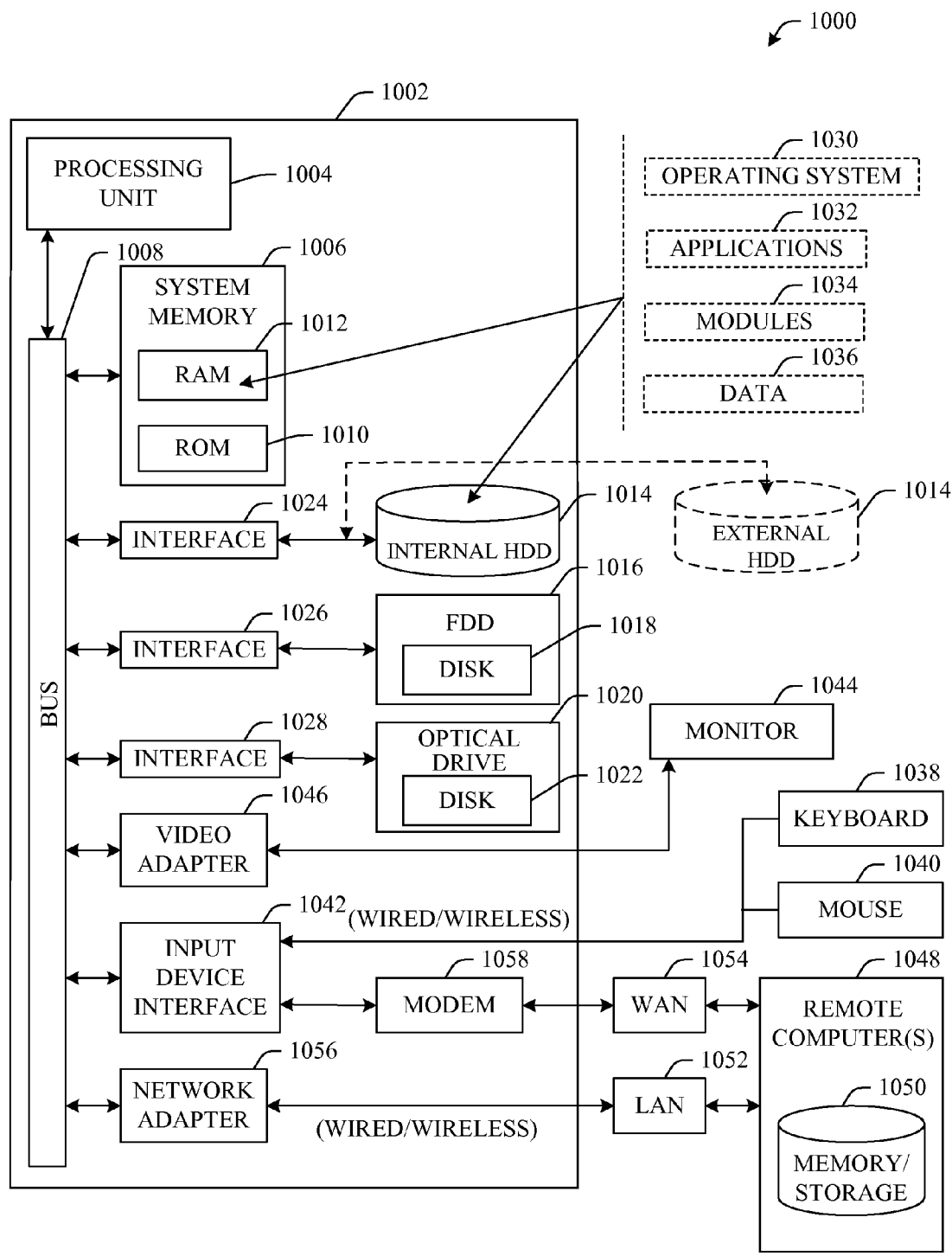
FIG. 10 illustrates a block diagram of a computer operable to execute the disclosed architecture.

Referring now to FIG. 10, there is illustrated a block diagram of a computer operable to execute the disclosed architecture. In order to provide additional context for various aspects of the subject innovation, FIG. 10 and the following discussion are intended to provide a brief, general description of a suitable computing environment 1000 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the exemplary environment 1000 for implementing various aspects of the innovation includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the innovation can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 11:
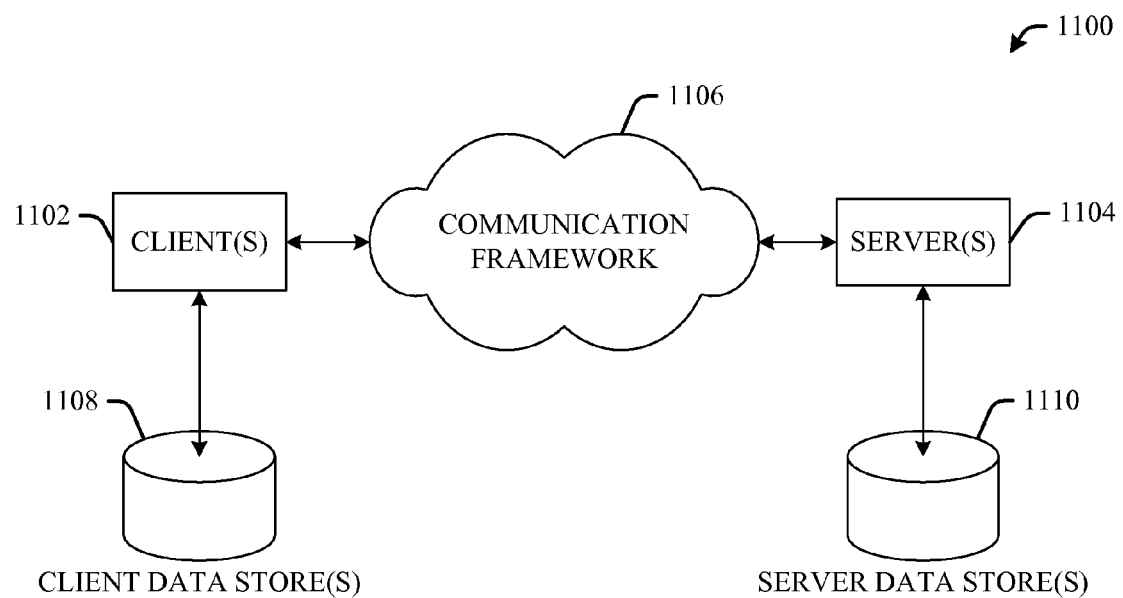
FIG. 11 illustrates a schematic block diagram of an exemplary computing environment in accordance with the subject innovation.

Referring now to FIG. 11, there is illustrated a schematic block diagram of an exemplary computing environment 1100 in accordance with the subject innovation. The system 1100 includes one or more client(s) 1102. The client(s) 1102 can be hardware and/or software (e.g., threads, processes, computing devices). The client(s) 1102 can house cookie(s) and/or associated contextual information by employing the innovation, for example.

The system 1100 also includes one or more server(s) 1104. The server(s) 1104 can also be hardware and/or software (e.g., threads, processes, computing devices). The servers 1104 can house threads to perform transformations by employing the innovation, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates dynamic alteration of a storybook, comprising:
    at least one processor adapted to implement components, the components comprising:
        a criteria management component that gathers a plurality of data including environment context data; and
        an adaptation component that dynamically alters a storyline of the storybook based upon at least the environment context data, wherein the adaptation component comprises at least a storyline adjustment component that incorporates at least the environment context data into the storyline by including in the storyline at least descriptive text that coincides with current environmental conditions.

2. The system of claim 1, wherein the plurality of data comprises at least one of a preference, policy, or predefined story feature.

3. The system of claim 1, further comprising a context monitor component that dynamically monitors an environment external to the system to generate the environment context data.

4. The system of claim 3, further comprising at least one environmental sensor that facilitates capture of the environment context data.

5. The system of claim 1, further comprising a query component that employs a query that facilitates gathering a subset of the plurality of data from at least one of a cloud-based source, local store or remote store based upon the storyline.

6. The system of claim 1, further comprising a user interaction component that prompts a user to select a subset of the plurality of data that is employed to alter the storyline.

7. The system of claim 1, further comprising a user interface component that enables the user to explicitly select a subset of the plurality of data that is employed to alter the storyline.

8. The system of claim 1, further comprising:
    an information aggregation component that consolidates the plurality of data;
    an analysis component that evaluates and organizes the plurality of data; and
    an authoring component that composes the altered storyline based upon the analysis.

9. The system of claim 1, further comprising a rendering component that presents the altered storyline to a reader.

10. The system of claim 9, further comprising a configuration component that configures the altered storyline as a function of a target device.

11. The system of claim 9, further comprising a filter component that cleanses the altered storyline as a function of a target audience.

12. The system of claim 1, further comprising a machine learning and reasoning component that employs at least one of a probabilistic and a statistical-based analysis that infers an action that a user desires to be automatically performed.

13. A computer-implemented method of dynamically altering a storyline of a storybook presenting a story to a user, comprising:
    with at least one processor:
        detecting contextual information, the contextual information relating to a physiological state of the user and to an environment of the user;
        altering the storyline by incorporating at least the contextual data relating to the physiological state of the user and to the environment of the user into the storyline; and
        presenting the altered storyline to a reader.

14. The computer-implemented method of claim 13, further comprising dynamically monitoring the physiological state of the user through at least one sensor to obtain the contextual information.

15. The computer-implemented method of claim 13, further comprising:

selecting an alternative scenario; and incorporating the alternative scenario into the altered storyline.

16. The method of claim 13, wherein:

the method further comprises predicting a mood of the user; and altering the storyline comprises matching the storyline to the mood of the user.

17. A method of operating a device, the method comprising:

gathering information that includes context information, the context information indicating a location of the device;

accessing information providing at least one characteristic of the location;

dynamically altering a storyline of a storybook by incorporating the at least one characteristic into the storyline by including in the storyline at least descriptive text that coincides with the at least one characteristic of the location; and presenting the storyline to a user through an interface on the device.

18. The method of claim 1, wherein:

the environment context data indicates ambient sound;

the adaptation component alters the storyline to include sound selected based on the ambient sound.

19. The method of claim 17, wherein the at least one characteristic of the location is one or more names of individuals at the location.

* * * * *

UNITED STATES PATENT AND TRADEMARK OFFICE
CERTIFICATE OF CORRECTION

| | | |
|---|---|---|
| PATENT NO. | : 7,890,534 B2 | |
| APPLICATION NO. | : 11/966907 | |
| DATED | : February 15, 2011 | |
| INVENTOR(S) | : Steven N. Bathiche et al. | |

It is certified that error appears in the above-identified patent and that said Letters Patent is hereby corrected as shown below:

In column 16, line 8, in Claim 18, delete "method" and insert -- system --, therefor.

Signed and Sealed this
Nineteenth Day of July, 2011

David J. Kappos
*Director of the United States Patent and Trademark Office*